Jan. 28, 1936.　　　W. R. GRISWOLD　　　2,028,903
INTERNAL COMBUSTION ENGINE
Filed Nov. 30, 1931　　　2 Sheets-Sheet 2
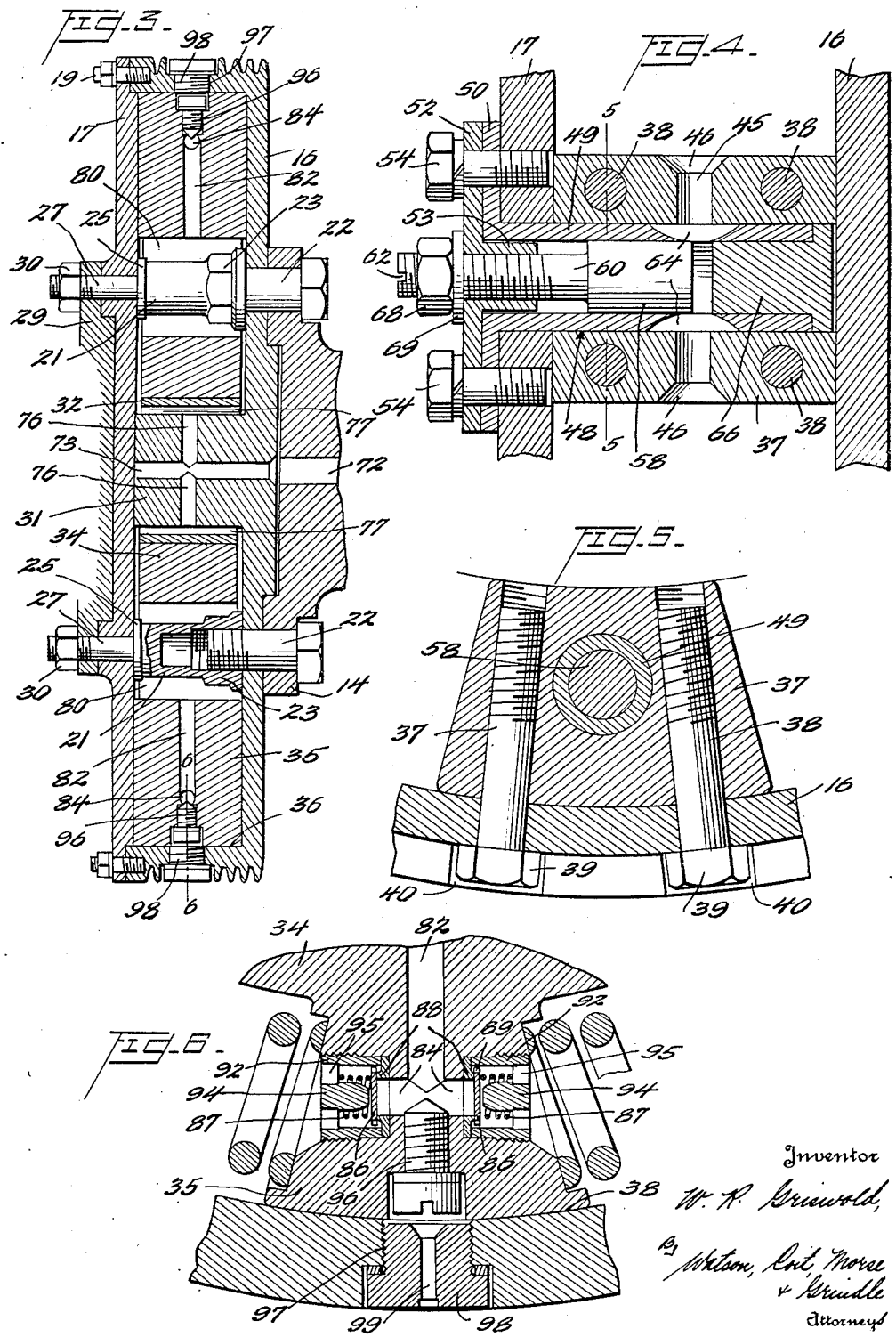

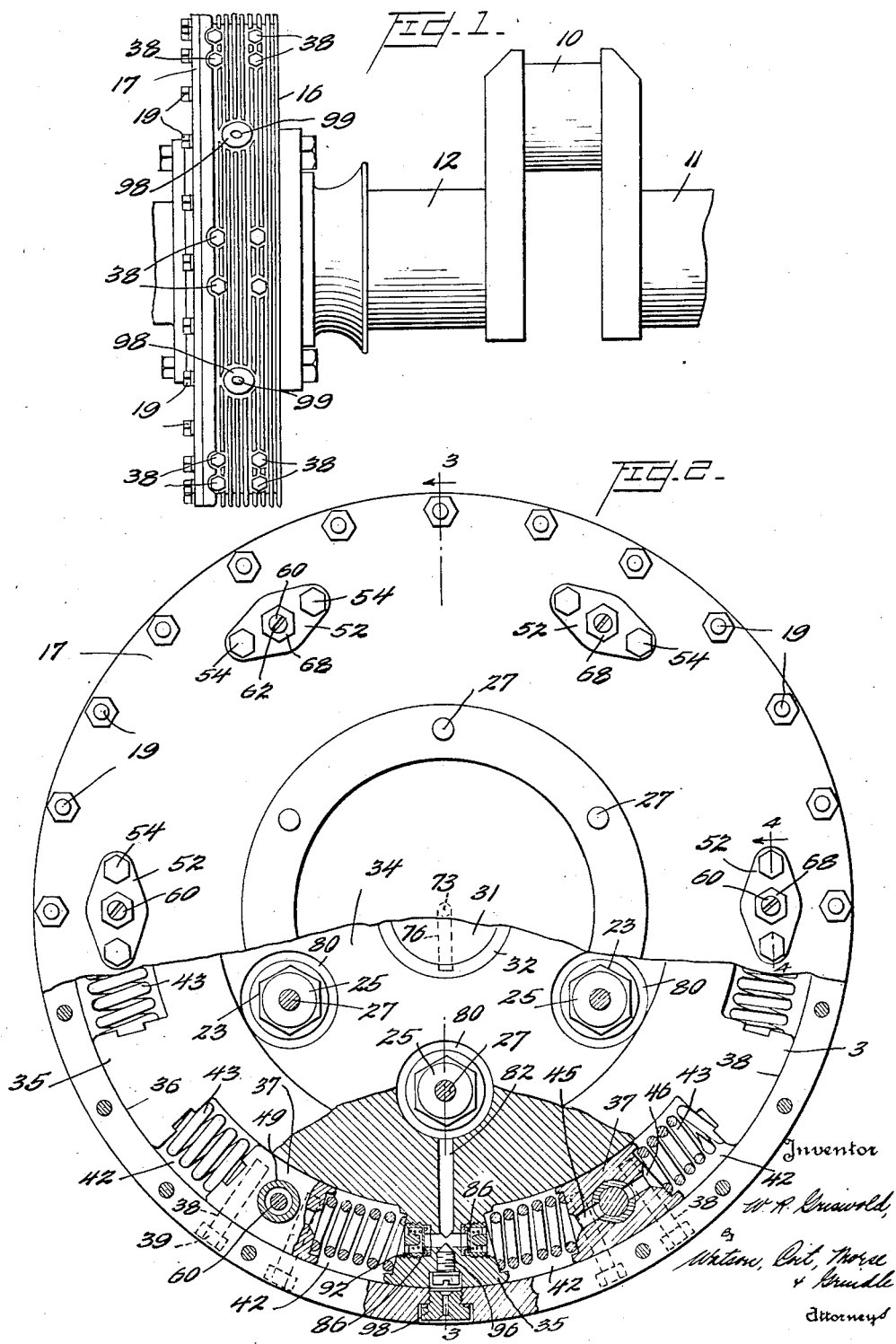

Patented Jan. 28, 1936

2,028,903

UNITED STATES PATENT OFFICE 2,028,903

INTERNAL COMBUSTION ENGINE

Walter R. Griswold, Detroit, Mich., assignor to Packard Motor Car Company, Detroit, Mich., a corporation of Michigan Application November 30, 1931, Serial No. 578,145

3 Claims. (Cl. 74—574)

This invention relates to means for damping vibrations in rotating bodies and is particularly concerned with the damping of torsional vibrations in engine crankshafts such as are induced by the periodic impulses applied to the crankshaft and serving to rotate the same.

It is an object of the invention to provide a vibration damper in which the energy of such vibrations is applied to cause movement of a substantially incompressible fluid, for instance oil, through a restricted passage, the energy being thereby dissipated in the form of heat.

Difficulty has heretofore been experienced in the construction of this type of damper, commonly referred to as a hydraulic damper, by reason of the limited space ordinarily available in the engine crank case which otherwise affords a convenient location for the damper, particularly since it permits the use of the engine lubricating oil as the hydraulic medium, and loss of this oil by leakage from the damper is of no consequence when the damper itself is within the crank case. It is therefore an object of the invention to provide a damper of this type which is small and compact having regard to the energy absorption requirements of the engine crankshaft for which it is designed and which is devoid of external abutments or other projections which might impede rotation of the crankshaft or require additional space for the mounting of the damper.

A further object of the invention is the provision of a hydraulic damper which is so constructed that flow of fluid resulting from vibration of the shaft is limited to substantially a single path or passage or a series of passages which may be readily controlled by throttling to permit accurate adjustment of the amount of energy absorbed by the damper to suit the conditions of use.

A further object of the invention is the provision of a damper of this type which may be readily and cheaply constructed and assembled.

Further objects and features of the invention will be apparent from the following description taken in connection with the accompanying drawings, in which Figure 1 is a view in elevation showing a portion of a crankshaft to which a damper constructed in accordance with the principles of the invention is applied;

Figure 2 is an end elevation partly in section and with parts broken away of the damper illustrated in Figure 1;

Figure 3 is a section on the line 3—3 of Figure 2;

Figure 4 is a section on the line 4—4 of Figure 2;

Figure 5 is a section on the line 5—5 of Figure 4; and

Figure 6 is a section on the line 6—6 of Figure 3.

It will be understood that the arrangement shown in the drawings is intended as illustrative of the principles underlying the present invention and that various changes and alterations in this construction may be made without departing from the spirit of the invention. Thus while the various component parts of the damper and their relationship are set forth in detail herein to facilitate an understanding of the invention, no limitation of the scope of the invention is thereby intended.

Figure 1 of the drawings shows a single throw crankshaft such as is commonly used in multicylinder radial engines including a crank throw 10 and supporting journals 11 and 12, it being understood that the latter are mounted in suitable bearings in the crank case (not shown). A circular flange is preferably formed on one end of this crankshaft and to this flange is bolted a peripherally ribbed housing 16 having the open side thereof closed by means of a cover plate 17, the latter being preferably secured to the housing 16 by bolts 19. It will be appreciated that the damper need not be located at the forward end of the shaft as illustrated in the drawing but since the damper shown is intended to function as a flywheel, the mounting illustrated is convenient, particularly since the damper when thus mounted can be completely enclosed within the crank case.

As will be apparent from Figure 3 of the drawings, the housing 16 and cover plate 17 are secured together and accurately spaced adjacent the central portion of the housing as well as at the periphery, this being effected by means of a plurality of spacing members 21 which are threaded to receive bolts 22 passing through the flange 14 on the crankshaft and through the wall of the housing 16. These spacing members are preferably provided with non-circular portions 23 to facilitate clamping of the parts by the bolts 22. The ends of the members 21 remote from the crankshaft are provided with shoulders 25 engaging the inner surface of the cover plate 17 and outwardly projecting threaded studs 27 extending through corresponding apertures in the cover plate. If desired these studs may also pass through apertures in the plate 29 constituting a portion of a governor (not shown) for controlling the speed of the shaft, nuts 30 serving to clamp the plate 29 and the cover plate 17 against the spacing members 25 to definitely determine the distance between the cover plate and the inner wall of the housing for a purpose hereinafter described.

The housing 16 is provided with an axially extending hub portion 31, preferably formed integrally therewith, and provided with a bearing sleeve 32 of suitable anti-friction material on which is journalled for free rotation an inertia member 34. This inertia member is of substantially annular shape and is provided at spaced portions on the periphery thereof with radially extending lugs or wings 35, the peripheral surfaces 36 of these wings being preferably machined to afford the minimum clearance with the peripheral portion of the casing 16 permitting free relative movement thereof. In the embodiment of the invention shown herein provision is made for six of these radial wings.

A corresponding number of inwardly projecting lugs or wings 37 is provided on the interior of the casing 16, each of the wings 37 being interposed between two adjacent wings 35 and disposed substantially equi-distant therefrom as shown in the drawings. The wings 37 are preferably formed separately and are secured to the periphery of the housing 16 by means of bolts 38, the heads 39 of the bolts being countersunk in recesses 40 in the drum periphery as illustrated in detail in Figure 5 of the drawings. The wings 37 are likewise accurately machined to ensure a snug fit with the peripheral wall 16 of the housing and to reduce the clearance between these wings and the periphery of the relatively movable inertia member 34 to a minimum. Thus a series of chambers 42 is provided between the adjacent wings 35 and 37 which may be filled with fluid to resist relative movement between the housing 16 and the inertia member 34, fluid passages, hereinafter described in detail, serving to connect these chambers to permit movement of the oil from one chamber to another when such relative movement takes place.

Resilient means, for instance coil springs 43 are interposed between and act against adjacent wings 35 and 37 to normally retain these wings in proper spaced relation and to return the inertia member 34 and the housing 16 to their normal relative position after any relative movement has taken place, these springs constituting the usual flexible or resilient connection between the inertia member and the shaft common to this type of damper.

It will be observed that the construction of the device is simplified to a considerable extent and a greater degree of accuracy is possible when the wings 37 are formed separately from the housing 16. Thus the interior of the housing may be accurately machined so that the wings 35 on the inertia member, the peripheries of which are also machined, may fit snugly therein, sufficient clearance being provided only to ensure against appreciable friction between the relatively movable members. Accurate machining of the abutting faces of the wings 37 and inertia member 34 may similarly be readily effected and the side walls of the inertia member may be machined to fit accurately within the housing 16 and cover plate 17, so that flow of fluid between adjacent chambers 42 other than through the passages provided for that purpose may be practically eliminated. In this connection it may be observed that the spacing members 21 are of considerable importance in ensuring an accurate fit between the lateral walls of the inertia member 34 and the housing 16 and cover plate 17 by preventing warping or spreading of the latter.

As shown in Figures 2 and 4, the fluid passage connecting adjacent chambers 42 is formed in the wings 37 and preferably comprises apertures 45 extending through each wing. These apertures are flared at their ends as shown at 46 to facilitate flow of fluid therethrough. A second transversely extending aperture 48 is formed in each wing, the apertures 48 and 45 intersecting and a bushing 49 extending within the aperture 48 and having an annular flange 50 seating against the outer surface of the cover plate 17 is provided. A plate 52 having a threaded boss 53 extending within the bushing is secured in position by means of bolts 54 extending through the plate 52, the flange 50 of the bushing 48, and threading into the cover plate 17. A valve member 58 having a sliding fit within the bushing 48 is carried on a stem 60 threaded within the boss 53, a slot 62 being provided in the outer end of the stem 60 whereby the latter may be turned to move the valve member 58 to the right or left as shown in Figure 4. Adjacent the point of intersection of the apertures 45 and 48 the bushing 49 is provided with countersunk apertures 64. Thus fluid may flow between adjacent chambers 42 through the apertures 45 and 64, the degree of resistance offered to the fluid being varied by adjusting the stem 60 and valve member 58 to cause the latter to intercept to a lesser or greater extent the fluid passage through the wing 37. The end of the aperture 48 remote from the cover plate 17 is closed by a plug 66 fitting within the aperture and within the bushing 49, the inner end of this plug being preferably in alignment with the wall of the apertures 45 and 64. Thus if the valve member 58 is moved to the right as shown in Figure 4 into engagement with the plug 66, flow of fluid through the apertures 45 will be practically prevented. It will of course be understood that the several valve members 58 are adjusted to offer that degree of resistance to flow of fluid which is necessary to ensure the absorption and dissipation of energy of vibration arising in the shaft with which the damper is used, the stems 60 of the valve members 58 being readily accessible for this purpose. If desired a lock nut 68 and washer 69 may be provided on each stem 60 to secure the latter in the position to which it is adjusted.

The fluid supplied to the chambers 42 is preferably the oil used for lubricating the crankshaft and associated parts. It will be understood that this oil is frequently supplied to the crankshaft bearings and the connecting rod bearings through apertures drilled in the shaft and in the application of the damper shown herein to a shaft of this type it is only necessary to continue the passage for lubricating oil through the shaft bearing 12 and through the flange 14 at the end of the shaft as indicated at 72. A passage 73 coextensive with the passage 72 is drilled through the center of the hub portion 31 of the inertia member 34, the passage 73 communicating in turn with radially extending passages 76 in the hub 31. Transversely extending grooves 77 are formed in the inner face of the bearing sleeve 32 which serves to journal the inertia member 34 on the hub 31 and the oil flows from the passages 76 through the groove 77 and past the side walls of the inertia member 34, it being observed that the inertia member is narrower at this point to provide clearance between the walls of the housing 16, the cover plate 17, and the inertia member.

The oil then passes into the openings 80 formed in the inertia member to accommodate the spacing sleeves 21 and thence to radially extending passages 82 in the inertia member. Transverse passages 84 communicating with the passage 82 lead through the wings 35 to the chambers 42 on either side of these wings. The passages 84 are each supplied with a non-return valve comprising a plate 86 urged by a spring 87 against a valve seat 88 to close the passage, the plate 86 being provided with radially extending lugs 89 to center and guide the same. A bushing 92 is threaded within a lateral recess in either side of each wing 35, this bushing serving to maintain the valve seat 88 in position adjacent the outer end of the aperture 84 and serving also as a support and guide for the spring 87. For the latter purpose the bushing may be provided with a centrally located spring supporting stud 94 and a plurality of wings 95 extending radially between the stud and the body of the bushing against which the spring may abut.

For convenience in manufacture the passages 82 may be drilled inwardly of the inertia member 34 through each wing 35 and the outer ends of these passages may be subsequently closed by a threaded stud 96. A plurality of apertures 97 are formed in the periphery of the housing 16, these apertures being closed by threaded studs 98 and being preferably located opposite each passage 82 in the inertia member so that by removal of these studs and the studs 96 the apertures 82 are accessible from the exterior of the casing for cleaning if necessary. The studs 98 are further provided with passages 99 therein through which a slight amount of oil may continually flow to the exterior of the housing and thus return to the crankcase, it being understood that this is advisable in order to ensure cooling and proper lubrication of the moving parts of the damper, sufficient oil seeping past the cooperating surfaces of the wings 35 and the housing 16 for this purpose.

By reason of the fact that substantially the entire interior of the housing 16 is continually supplied with fresh oil and a film of oil is present on all relatively movable contacting surfaces, any wear taking place in the damper as the result of relative movement induced by shaft vibrations is practically negligible.

The operation of the device will be readily understood from the foregoing description, the oil being continually supplied under pressure from the engine pump ordinarily provided for that purpose to the several chambers 42, return of oil through the supply passages being effectively prevented by the non-return valves associated with the passages 84. When vibration occurs in the shaft, the inertia member 34 and the housing 16 secured to the shaft will move relatively and oil will surge through the apertures 45, the resistance of this surging of the oil between adjacent chambers 42 being readily controlled by manipulation of the valve members 58. Outwardly projecting parts are substantially eliminated from the damper, it being noted in particular that the periphery of the housing 16 is free of any projections such as might require an increase in size, however small, of the damper. The construction is such that any flow of oil which occurs as a result of the rapid relative oscillatory movement of the inertia member and housing must take place past the control valves so that the amount of energy absorbed by this movement of the fluid may be very delicately and accurately adjusted.

Having thus described the invention, what is claimed as new and desired to be secured by Letters Patent is:—

1. In a vibration damper for shafts, the combination with a casing adapted to be secured to a shaft, said casing having an inner portion adjacent the shaft axis and an outer circumferentially extending portion remote from the shaft axis, of an inertia member rotatable within said casing, said inertia member fitting closely between the side walls of said casing, radially extending means carried by said inertia member and casing and cooperating to form a plurality of fluid chambers variable in size in response to relative movement of said casing and inertia member, and means intermediate the inner and outer portions of said casing for definitely spacing the side walls of said casing.

2. In a vibration damper for shafts, the combination with a casing adapted to be secured to a shaft, said casing having an inner portion adjacent the shaft axis and an outer circumferentially extending portion remote from the shaft axis, of an inertia member rotatable within said casing, said inertia member fitting closely between the side walls of said casing, radially extending means carried by said inertia member and casing and cooperating to form a plurality of fluid chambers variable in size in response to relative movement of said casing and inertia member, and means intermediate the inner and outer portions of said casing for definitely spacing the side walls of said casing, said last named means extending transversely through said inertia member.

3. In a vibration damper for shafts, the combination with a casing adapted to be secured to a shaft, said casing having an inner portion adjacent the shaft axis and an outer circumferentially extending portion remote from the shaft axis, of an inertia member rotatable within said casing, said inertia member fitting closely between the side walls of said casing, radially extending means carried by said inertia member and casing and cooperating to form a plurality of fluid chambers variable in size in response to relative movement of said casing and inertia member, and means intermediate the inner and outer portions of said casing and acting between the side walls thereof to reinforce the latter.

WALTER R. GRISWOLD.